(12) United States Patent
Yamada et al.

(10) Patent No.: US 6,953,178 B2
(45) Date of Patent: Oct. 11, 2005

(54) SEAT SLIDE DEVICE FOR VEHICLE

(75) Inventors: Yukifumi Yamada, Toyota (JP); Takami Terada, Toyota (JP); Hiroyuki Okazaki, Chiryu (JP); Toshiyuki Tanaka, Toyota (JP); Hideki Kobayashi, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/375,081

(22) Filed: Feb. 28, 2003

(65) Prior Publication Data
US 2003/0230696 A1 Dec. 18, 2003

(30) Foreign Application Priority Data
Feb. 28, 2002 (JP) .......................................... 2002-054111

(51) Int. Cl.$^7$ ............................................... F16M 13/00
(52) U.S. Cl. ....................................................... 248/429
(58) Field of Search ................................. 248/429, 423, 248/424; 296/187.05, 187.03; 293/155, 133; 297/472, 216.8

(56) References Cited

U.S. PATENT DOCUMENTS 6,286,799 B1 * 9/2001 Fujii .......................... 248/430
6,341,819 B1    1/2002 Kojima et al.
2002/0190182 A1   12/2002 Flick et al.

FOREIGN PATENT DOCUMENTS

| DE | 195 17 701 C1 | 9/1996 |
| DE | 196 13 506 C2 | 2/1998 |
| DE | 100 50 959 A1 | 5/2002 |
| FR | 2 787 749 A1 | 6/2000 |
| JP | 10-297425 A | 11/1998 |
| JP | 11-348627 A | 12/1999 |

* cited by examiner

Primary Examiner—Korie Chan
Assistant Examiner—Kofi Schulterbrandt
(74) Attorney, Agent, or Firm—Burns, Doane, Swecker & Mathis, LLP

(57) ABSTRACT

A seat slide device which includes a lower rail fixed to a vehicle floor, an upper rail fitted into the lower rail to be slidable relative to the lower rail for supporting a seat, a lock device for fixing the upper rail at an arbitrary position of the lower rail, a lock lever provided in the lock device and rotatably supported on the upper rail, a lock bore formed on the lower rail, a pawl provided on the lock lever for being able to be inserted into the lock bore, and an energy absorbing bore provided on the lower rail and arranged in series with the lock bore and separated from the lock bore by a predetermined distance.

16 Claims, 7 Drawing Sheets

SEAT SLIDE DEVICE FOR VEHICLE

This application is based on and claims priority under 35 U.S.C. § 119 with respect to Japanese Patent Application No. 2002-054111 filed on Feb. 28, 2002, the entire content of which is incorporated herein by reference.

FIELD OF THE INVENTION

The present invention relates to a vehicle seat slide device. More particularly, the present invention pertains to a vehicle seat slide device which absorbs the impact force to a seat for mitigating the shock affecting on an occupant.

BACKGROUND OF THE INVENTION

Known vehicle seat slide device includes a pair of lower rails fixed to a vehicle floor, a pair of upper rails fitted into the lower rails to be slidable in the longitudinal direction relative to the lower rails and supporting a seat, and a lock device for maintaining each lower rail and upper rail to be fixed. Japanese Patent Laid-Open Publication No. H11-348627 discloses a known vehicle seat slide device which includes a pair of lower rails having U shaped cross section and a pair of upper rails having approximately reversed T shaped cross section. In the construction of the known vehicle seat slide device according to Japanese Patent Laid-Open Publication No. H11-348627, a bottom portion of the upper rail is inserted into the lower rail and engages with opposing side wall portions of the lower rail via rollers and shoes. A plurality of lock bores are provided on one of the opposing side wall portions of the lower rail in series with a predetermined distance one another. An engaging piece of a lock lever pivotally supported by a bracket fixed to the upper rail is inserted into lock bores provided on the bracket, the side wall portion of the lower rail, and the bottom portion of the upper rail. Under a state that the engaging piece of the lock lever is inserted into the lock bores of the bracket, the sidewall portions of the lower rail, and the bottom portions of the upper rail, the lock lever is supported on two points thereof by the upper rail side. And the lock lever opposes to the lock bore of the lower rail at a portion between the two supported portion thereof. Thus, when the impact force is applied to the seat upon the frontal or rear collision of the vehicle, shearing stress is generated on both of contact portions between the lock lever and the lock bore of the lower rail.

The lock lever is made of a plate member having an L shape in cross section, and a horizontal plate part of lock lever is the engaging piece which includes either two pawls or three pawls. The pawls are inserted into each lock bore. Thus, when the impact is applied on the seat, the horizontal plate part hits on an upstanding plate part of the lock bore of the lower rail, and the sharing force is generated on and shears the upstanding plate part. The impact force is absorbed by the shearing and mitigated effectively, and the drop out of the seat from the lower rail is prevented.

Because the strength of the upstanding plate part of the lower rail having the lock bores is determined to be lower than the strength of the plane plate of the lock lever, the engaging piece which is the horizontal plane plate of the lock lever is consecutively entering adjacent lock bores while breaking the upstanding plate portions of the lower rail to absorb the impact energy.

In the configurations of H11-348627, the lock bores of the lower rail are only provided on portions necessary for adjusting the seat position in the longitudinal direction of the vehicle. This prevents the undesired lock of the seat at the undesired position and further ensures the strength of the opposing sidewall portions of the lower rail. Notwithstanding, when the engaging piece of the lock lever is inserted into either at a front most or rear most position of the lock bore, when the horizontal plate portion serving as the engaging piece of the lock lever is broken by the impact force, the seat posture may suddenly and significantly be changed, because there is no adjacent lock bores to absorb the impact applied to the seat either by the collision from the front or the collision from the rear.

A need thus exists for a vehicle seat slide device which securely absorbs the impact due to the collision from the longitudinal directions.

SUMMARY OF THE INVENTION

In light of the foregoing, the present invention provides a seat slide device which includes a lower rail fixed to a vehicle floor, an upper rail fitted into the lower rail to be slidable relative to the lower rail for supporting a seat, a lock device for fixing the upper rail at an arbitrary position of the lower rail, a lock lever provided in the lock device and rotatably supported on the upper rail, a lock bore formed on the lower rail, a pawl provided on the lock lever for being insertable into the lock bore, and an energy absorbing bore provided on the lower rail and arranged in series with the lock bore and separated from the lock bore by a predetermined distance.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
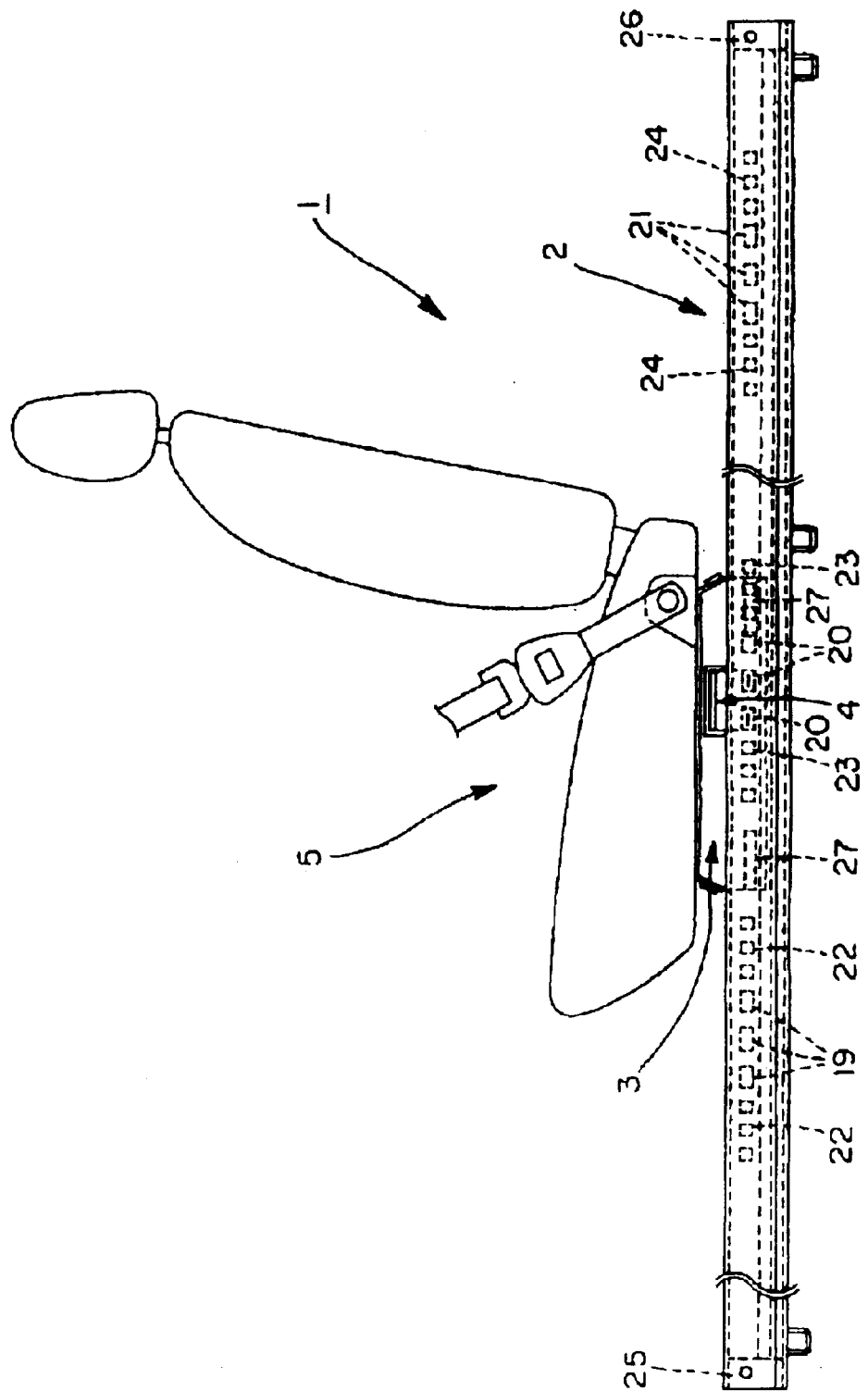
FIG. 1 is a front view of a vehicle seat slide device according to an embodiment of the present invention.

Referring now to the drawings, wherein like reference numerals designate identical or corresponding parts throughout the several views, the present invention will be described.

Figure 2:
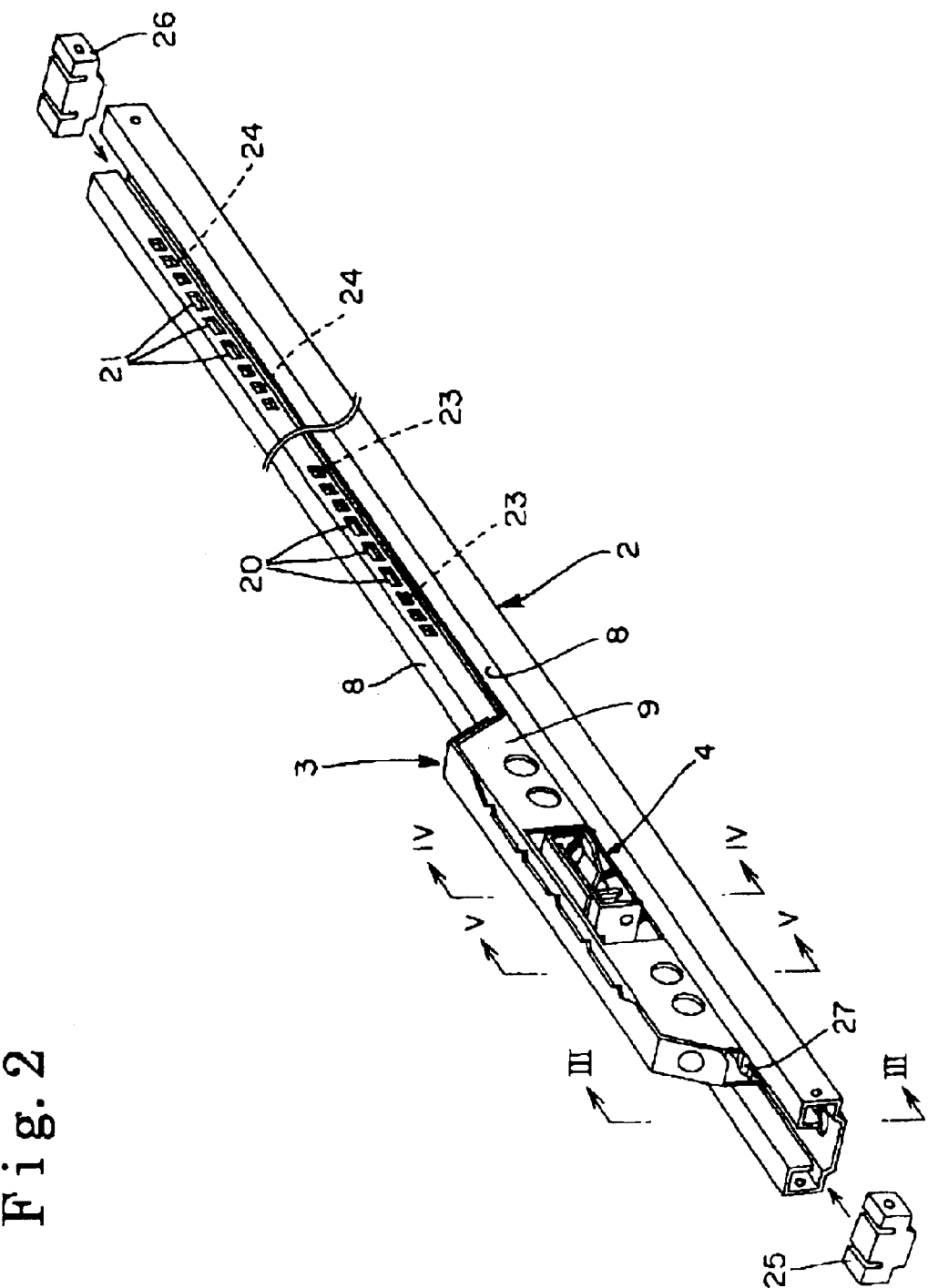
FIG. 2 is a perspective view showing a lower rail and an upper rail according to the embodiment of the present invention.

As shown in FIGS. 1–2, a vehicle seat slide device 1 includes a pair of lower rails 2 fixed to a vehicle floor, a pair of upper rails 3 fitted into the lower rails to be slidable relative to the lower rails 2 in a longitudinal direction of the vehicle, and a lock device for maintaining the lower rails 2 and the upper rails 3 to be fixed one another. The upper rails 3 support a seat 5.

Figure 3:
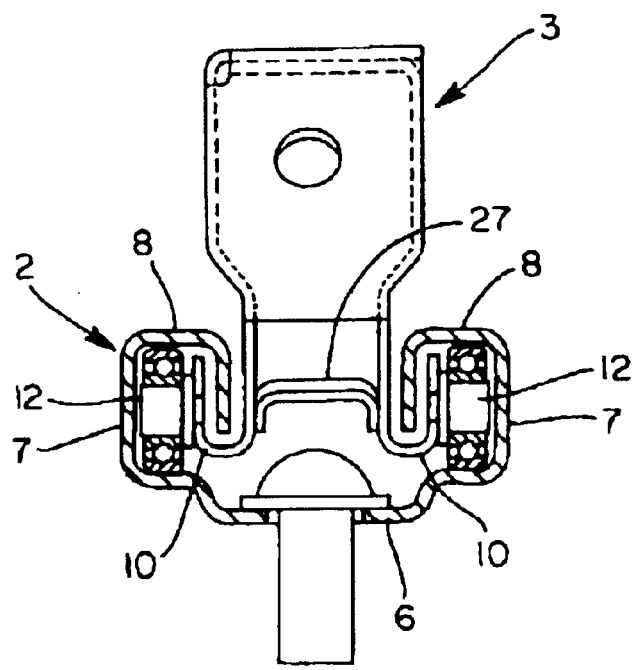
FIG. 3 is a cross sectional view taken on line III—III of FIG. 2 according to the embodiment of the present invention.
Figure 5:
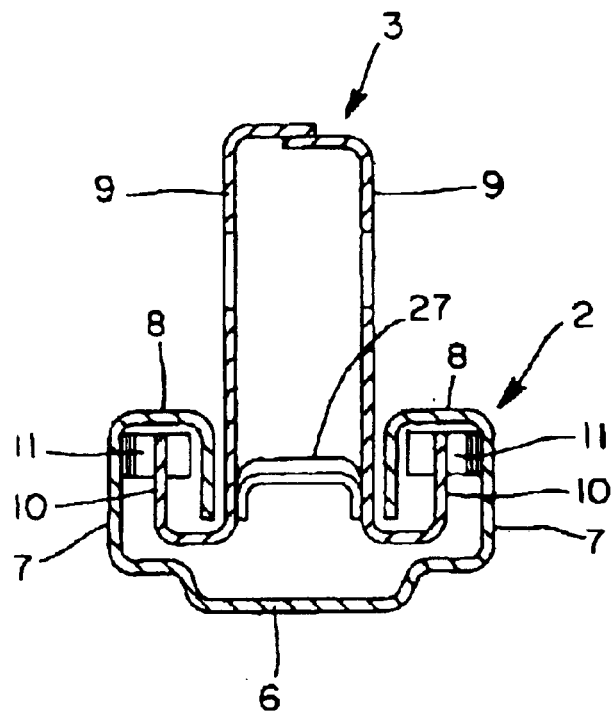
FIG. 5 is a cross sectional view taken on line V—V of FIG. 2 according to the embodiment of the present invention.

As shown in FIGS. 3 and 5, the lower rail 2 includes a body portion of approximately U-shaped cross section having a bottom portion 6 and opposing side wall portions 7, 7 and a flange portion 8 having approximately L shape and formed in one piece with the body portion. The upper rail 3 includes a body portion having plate portions 9 having two plates separated and opposing each other and L shaped flange portions 10, 10 formed as one piece with the plate portions 9 at the bottom. The flange portion 8, and the flange portion 10 are slidably engaged one other via a shoe 11 (shown in FIG. 5). Bearings 12 supported by the flange portions 10, 10 are provided in a space between the flange portion 10 of the upper rail 3 and the sidewall portion 7 of the lower rail 2 (shown in FIG. 3). Plural shoes 11 and plural bearings 12 are fixed with a predetermined distance each other in the longitudinal direction.

Figure 4:
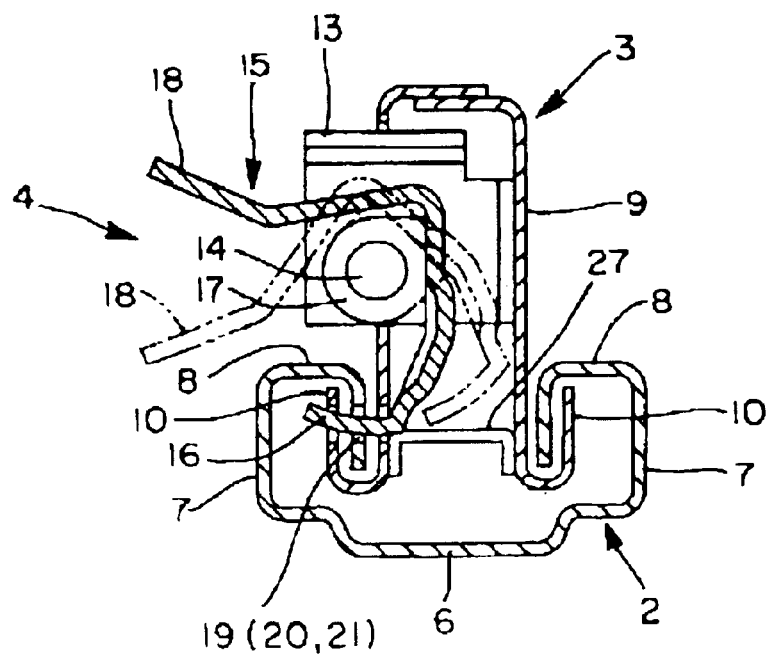
FIG. 4 is a cross sectional view taken on line IV—IV of FIG. 2 according to the embodiment of the present invention.
Figure 6:
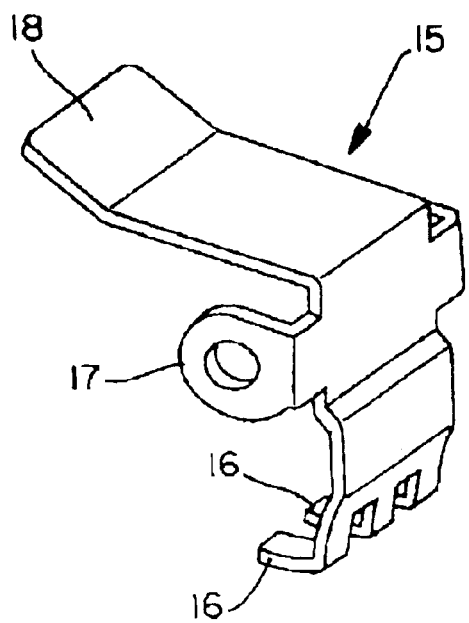
FIG. 6 is a perspective view showing a lock lever according to the embodiment of the present invention.

As shown in FIG. 4, the lock device 4 includes a bracket 13 fixed to the upper rail 3 and a lock lever 15 pivoted to opposing wall potions of the bracket 13 using a shaft 14. As shown in FIG. 6, the lock lever 15 includes three pawls 16, a pair of supporting pieces 17 having bores for inserting the shaft 14, and an operation piece for rotating the lock lever 15 about the shaft 14 by a loop handle (not shown).

Lock bores 19, 20, 21 for inserting the three pawls 16 of the lock lever 16 are formed on at least one of the flange portions 8 of the lower rail 2. Three lock bores 19 at front portion, three lock bores 20 in the middle portion, and three lock bores 21 at rear portion are provided as shown in FIGS. 1–2 in this embodiment. The number of the lock bores is not limited to the proportions of the embodiment. Distances between three lock bores 19 are determined to be able to absorb the impact by breaking wall portions between adjacent lock bores 19 by the pawls 16, when the impact is applied to the seat 5 either from the front or the rear direction under the state that the three pawls 16 of the lock lever 15 are inserted into the lock bore 19. The distance between the lock bores 20 and the distance between the lock bores 21 are determined likewise the distance between the lock bores 19.

Although three pawls 16 are provided in this embodiment, two of the pawls or other appropriate number of the pawls may be determined through the experiments. For example, when the lower rail 2 is made from a steal plate (i.e., tensile strength: 60 kg/mm$^2$) having a thickness of 1.6 mm, the pawl 16 may be made from a steal plate (i.e., tensile strength: 100 kg/mm$^2$) having a thickness of 3.2 mm.

Adjacent to a most front bore of the lock bores 19 or a most rear bore of the lock bores 19, a plurality of energy absorbing bores 22 keeping a predetermined interval each another are provided in the longitudinal direction. Likewise, a plurality of separated energy absorbing bores 23 are formed adjacent to a most front bore of the lock bores 20 or a most rear bore of the lock bores 20. A plurality of energy absorbing bores 24 are formed adjacent to a most front bore of the lock bores 21 or a most rear bore of the lock bores 20. The size of the energy absorbing bores 22, 23, 24 are determined to be smaller than the size of the lock bores 19, 20 21. The pawls 16 of the lock lever 15 break the wall portions of the lock bores 19, 20, 21 inserted with the pawl 16, enter the energy absorbing bores 22, 23, 24, and absorb the impact applied to the seat 5 by further breaking the wall portions of the energy absorbing bores 22, 23, 24.

Three of respective rectangular energy absorbing bores 22, 23, 24 having approximately a half size of the lock bore are provided at front and at rear of respective lock bores 19, 20, 21 in this embodiment. However, the number, the size, and the configuration of the energy absorbing bores 22, 23, 24, are not limited to the embodiment. The condition of the number, the size, and the configuration of the energy absorbing bores 22, 23, 24 are that the pawls 16 of the lock lever 15 are to be movable either in the front or rear direction while breaking the wall portions between the bores. The height of the energy absorbing bores 22, 23, 24 is determined to be greater than the thickness of the pawls 16. It is necessary to determine the size and the configuration of the energy absorbing bores 22, 23, 24, so that the pawls 16 of the lock lever 15 can not be inserted into the energy absorbing bores 22, 23, 24. Thus, the pawls 16 of the lock lever 15 can not be locked at the position of the energy absorbing bores 22, 23, 24, when the occupants select the preferable position of the seat 5 for him/her by moving the seat 5 in the longitudinal direction.

Known type of stoppers 25, 26 are fixed to front and rear end portions of the lower rail 2. The stopper 25, 26 prevents the separation of the seat 5 from the lower rails 2 when adjusting the seat position.

The lower rail 2 of the embodiment shown in FIGS. 1–2 have a configuration being considerably long in the longitudinal direction of the vehicle. Portions being not provided with the lock bores are provided on the middle part of the lower rail 2 at the front and rear of the lock bores 20. The lower rail 2 is for the seat slide device 1 which is applied to a wagon type vehicle. The seat on the wagon type vehicle can be arranged to provide a seat space for the occupants or as a luggage space by adjusting the seat slide device 1. By providing the energy absorbing bores on the front and the rear portions of respective lock bores on the lower rail 2 of the seat slide device 1, the impact energy can be absorbed wherever the seat is positioned, and the large effect for absorbing the impact energy can be obtained.

Figure 7:
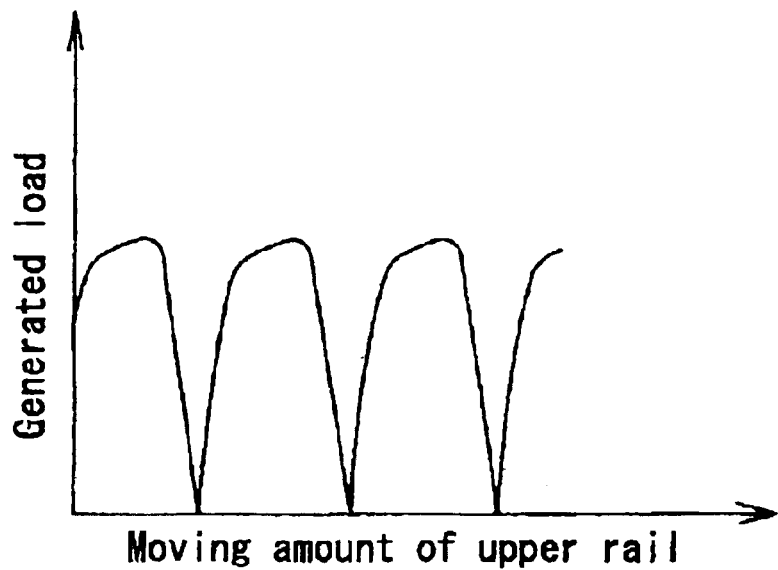
FIG. 7 is a graph showing a relationship between a moving amount of the upper rail and a generated load according to the embodiment of the present invention.

As shown in FIG. 7, when the impact force is applied to the seat 5, the pawls 16 break the wall portion of the lock bores where the pawls 16 are inserted. After the pawls 16 move into the adjacent bore, the generated load once becomes zero, the generated load is increased again by breaking the next wall of the bore with moving to the adjacent bore. That is, the impact energy is consecutively absorbed in the foregoing manner. In this case, the maximum value of the generated load is determined as appropriate for ensuring the safety of the occupants.

In the embodiment of the present invention shown in the figures, the thickness of the pawls 16 is doubled of the thickness of the lower rail 2 and different materials are applied to the lower rail 2 and the pawls 16 so that the strength of the pawls 16 becomes greater than the strength of the lower rail 2. For giving different strength to the lower rail 2 and the pawls 16, providing notches on a longitudinal wall portion of the lock bores and the energy absorbing bores in accompanying with the selection of the plate thickness and the material is available. By providing suitable notches on the longitudinal wall portion of the lock bores and the energy absorbing bores, as shown in FIG. 1, the generated load can be larger at the beginning and gradually be reduced at the vehicle collision from the longitudinal direction, so that the deceleration generated on the seat 1 is minimized and the impact to the occupants can be effectively absorbed. In order to reduce the load, for an example, more number of the notches may be provided on the longitudinal portion of the energy absorbing bores as being away from the energy absorbing bore adjacent to the lock bore. The notches may be provided also on the lock bores.

Figure 9:
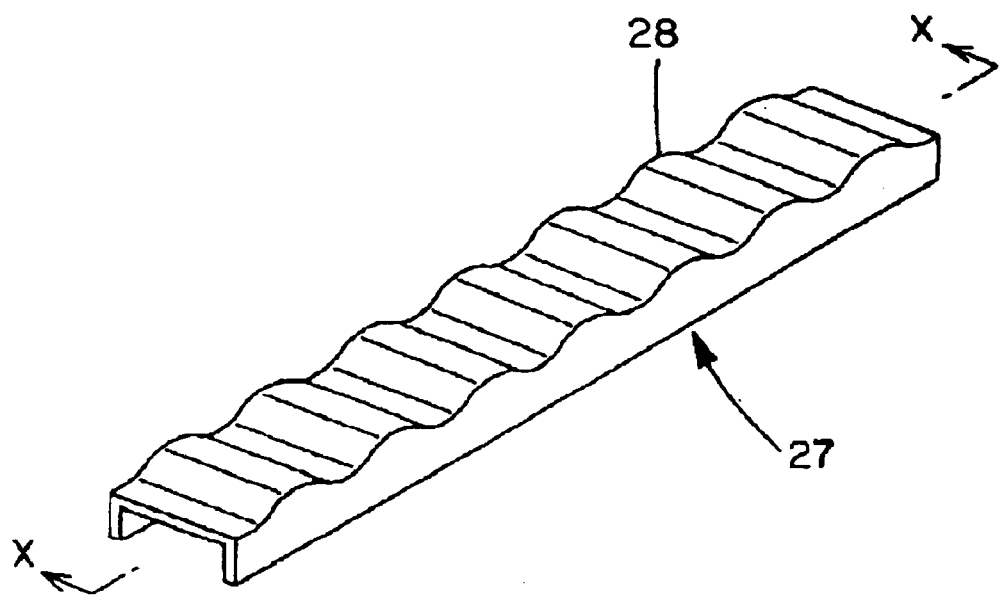
FIG. 9 is a perspective view showing a reinforcement member according to the embodiment of the present invention.
Figure 10:
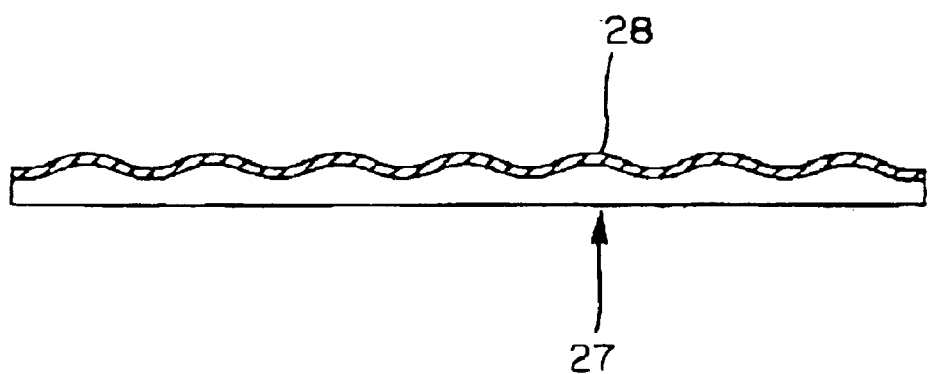
FIG. 10 is a cross sectional view taken on line X—X of FIG. 9 according to the embodiment of the present invention.
Figure 11:
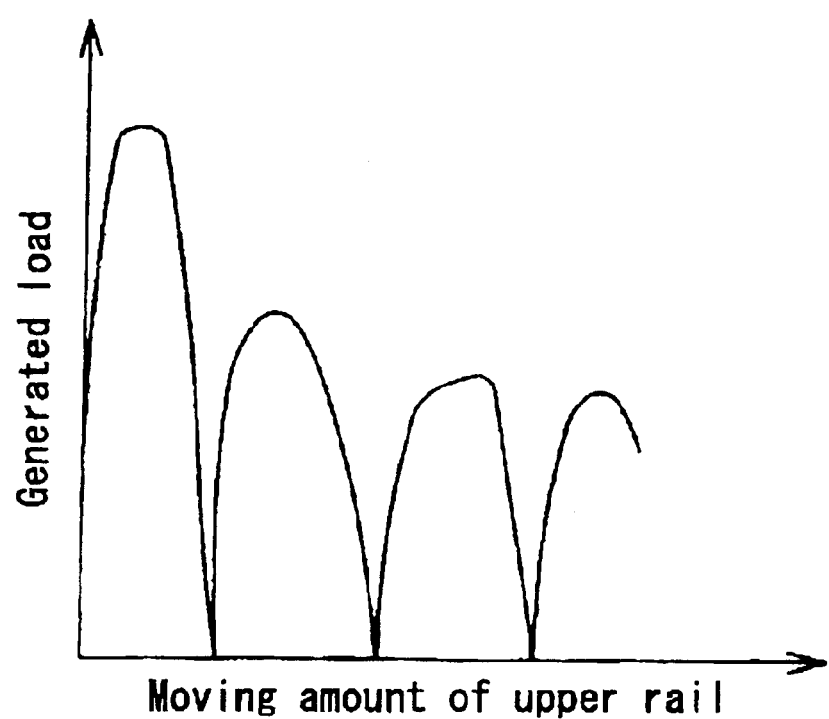
FIG. 11 is a graph showing a relationship between the moving amount of the upper rail and the generated load when a notch is formed on an energy absorbing bore according to another embodiment of the present invention.

As shown in FIGS. 1 and 3 to 5, a reinforcement member 27 is welded to the opposing plate portions 9, 9, for connecting the bottom portions of the opposing plate portions 9, 9 of the upper rail 3. With this embodiment, two reinforcement members 27 are provided keeping a distance. The reinforcement member 27 is formed by press forming the steal plate in channel configuration. A waved portion 28 having grooves in the vehicle width direction is formed on the top of the reinforcement portion 27 (shown in FIGS. 9 to 10).

Because the center of gravity of the seat 5 including the occupant is positioned above the upper rail 3, the upper rail 3 strongly pushes the front end portion of the lower rail 2 downward and pulls the rear end portion of the lower rail 2 upward at the vehicle frontal collision. On the contrary, upon the vehicle rear collision, the upper rail 3 strongly pulls the front end portion of the lower rail 2 upward and pushes the rear end portion of the lower rail 2 downward. If the upper rail 3 does not have the reinforcement member 27 as shown in FIG. 8, and when the force in the upward direction is applied to upper rail 3, the distance between the opposing plates at the bottom portion of the upper rail 3 is reduced, a top portion of the lower rail 2 is opened in the external direction, then the upper rail 3 may be dropped out from the lower rail 2.

Figure 8:
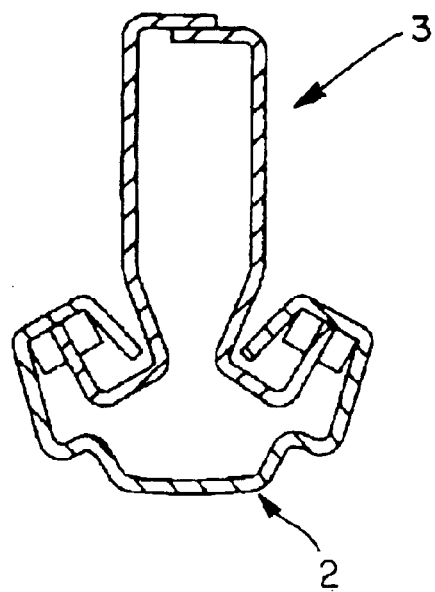
FIG. 8 is a cross sectional view showing a deformed upper rail not including a reinforcement according to a known vehicle seat slide device.

As shown in FIGS. 3 to 5, by welding the reinforcement member 27 to the bottom portions of the upper rail 3 at the front and rear portion, the deformation of the upper rail 3 as shown in FIG. 8 is not caused upon applying the impact to the seat 5 and the separation of the upper rail 3 from the lower rail 2 can be prevented. That is, the load for deforming the upper rail 3 in the direction for approximating the opposing plate portions 9, 9 at the bottom of the upper rail 3 when the impact is applied to the upper rail 3 corresponds to the compression load to the reinforcement members 27, 27 in the vehicle width direction. The compression load in the vehicle width direction is received by the reinforcement members 27, 27 to maintain the configuration of the upper rail 3.

According to the embodiment of the present invention, because the energy absorbing bores are formed at the front and at the rear of the lock bores, the impact applied to the seat can be absorbed by breaking the wall portions for demarcating the energy absorbing bores even when the seat position is adjusted at a most front position or at a most rear position.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat slide device comprising:
    a lower rail fixed to a vehicle floor;
    an upper rail fatted into the lower rail to be slidable relative to the lower rail for supporting a seat;
    a lock device for fixing the upper rail at an arbitrary position of the lower rail;
    a lock lever provided in the lock device and supported on the upper rail;
    a plurality of lock bores formed on the lower rail;
    a pawl provided on the lock lever for being inserted into one of the lock bores; and
    at least one energy absorbing bore positioned between two of the lock bores in a longitudinal direction of the lower rail, with a size of at least one dimension of said energy absorbing bore being configured relative to a size of at least one dimension of said pawl so that the pawl cannot be inserted in the energy absorbing bore.

2. A seat slide device according to claim 1, wherein a plurality of the energy absorbing bores are provided, the lock bores are provided at a front, middle and rear portion of the lower rail and the energy absorbing bores are provided at a front and rear of the lock bore at the each portion.

3. A seat slide device according to claim 2, wherein the at least one energy absorbing bore is smaller in size than said two lock bores.

4. A seat slide device according to claim 1, wherein the at least one energy absorbing bore is smaller in size than said two lock bores.

5. A seat slide device according to claim 4, wherein the lower rail further comprises an opposing flange portion formed on a body portion having a U-shaped cross section and on opposing side wall portions of the body portion as one piece; and wherein the two lock bores and the at least one energy absorbing bore are formed on at least one of the flange portion.

6. A vehicle seat slide device according to claim 5, further including a wall portion between the two lock bores and the at least one energy absorbing bore, the wall portion having a size which can be broken by the pawl of the lock lever by the impact affecting on the seat at the frontal or rear collision of the vehicle.

7. A vehicle seat slide device according to claim 1, further including a wall portion between the two lock bores and the at least one energy absorbing bore, the wall portion having a size which can be broken by the pawl of the lock lever by the impact affecting the seat at the collision either from the front or from the rear direction.

8. A seat slide device comprising:
    a lower rail fixed to a vehicle floor, the lower rail comprising a bottom portion and a pair of opposing side wall portions extending upwardly from the bottom portion;
    an upper rail comprising two spaced apart plate portions possessing bottom portions positioned between the side wall portions of the lower rail, the upper rail being slidable relative to the lower rail and being adapted to support a seat;
    a lock device for fixing the upper rail at an arbitrary position of the lower rail;

a lock lever provided in the lock device and supported on the upper rail;

a lock bore formed on the lower rail;

a pawl provided on the lock lever for being inserted into the lock bore, an energy absorbing bore provided on the lower rail and arranged in series with the lock bore and separated from the lock bore by a predetermined distance; and a reinforcement member extending between the two plate portions of the upper rail and fixed to the two plate portions of the upper rail;

wherein the reinforcement member is welded to inner surfaces of the two plate portions that face one another.

9. A vehicle seat slide device according to claim 8, wherein the reinforcement member extends in a longitudinal direction of the upper rail, is fixed to the front and rear portions of the upper rail and includes channels extending in a vehicle width direction.

10. A vehicle seat slide device according to claim 9, wherein the channels are configured as a waveform on a top portion of the reinforcement member.

11. A vehicle seat slide device according to claim 8, wherein said energy absorbing bore is configured so that a size of at least one dimension of said energy absorbing bore is different from a size of at least one dimension of said pawl so that the pawl cannot be inserted in the energy absorbing bore.

12. A vehicle seat slide device according to claim 8, wherein said energy absorbing bore is smaller in size than said lock bore.

13. A seat slide device comprising:

a lower rail fixed to a vehicle floor;

an upper rail fitted into the lower rail, the upper rail being slidable relative to the lower rail and being adapted to support a seat;

a lock device for fixing the upper rail at an arbitrary position of the lower rail;

a lock lever provided in the lock device and supported on the upper rail;

a lock bore formed on the lower rail;

a pawl provided on the lock lever and adapted to be inserted into the lock bore, at least one energy absorbing bore on the lower rail arranged in series with the lock bore and spaced from the lock bore, a size of at least one dimension of said energy absorbing bore being configured relative to a size of at least one dimension of said pawl so that the pawl cannot be inserted in the energy absorbing bore; and a reinforcement member provided with the upper rail.

14. A vehicle seat slide device according to claim 13, wherein the reinforcement member extends in a longitudinal direction of the upper rail and is fixed to front and rear portions of the upper rail.

15. A vehicle seat slide device according to claim 13, wherein the upper rail comprises two vertical plate portions having upper portions connected to one another, the two vertical plate portions being spaced apart from one another to define a channel-shaped upper rail, each of the plate portions having lower portions positioned within the lower rail.

16. A vehicle seat slide device according to claim 15, wherein the reinforcement member possesses a wave-shaped upper surface facing towards an interior of the channel-shaped upper rail.

* * * * *